(12) United States Patent
Park et al.

(10) Patent No.: US 9,927,842 B2
(45) Date of Patent: Mar. 27, 2018

(54) COMPUTING DEVICE WITH A ROTATABLE DISPLAY MEMBER

(71) Applicant: HEWLETT-PACKARD DEVELOPMENT COMPANY, L.P., Houston, TX (US)

(72) Inventors: Chan Park, Houtson, TX (US); Wen-Yo Lu, Pasadena, CA (US); Chad Patrick Paris, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/500,675

(22) PCT Filed: Sep. 26, 2014

(86) PCT No.: PCT/US2014/057714
§ 371 (c)(1),
(2) Date: Jan. 31, 2017

(87) PCT Pub. No.: WO2016/048356
PCT Pub. Date: Mar. 31, 2016

(65) Prior Publication Data
US 2017/0220075 A1    Aug. 3, 2017

(51) Int. Cl.
*H05K 7/00* (2006.01)
*H05K 5/00* (2006.01)
*G06F 1/16* (2006.01)

(52) U.S. Cl.
CPC .......... *G06F 1/1679* (2013.01); *G06F 1/1613* (2013.01); *G06F 1/1681* (2013.01);
(Continued)

(58) Field of Classification Search
CPC ......................................................... G06F 1/16
(Continued)

(56) References Cited

U.S. PATENT DOCUMENTS 6,301,101 B1    10/2001 Anzai et al.
6,727,894 B1    4/2004 Karidis et al.
(Continued)

FOREIGN PATENT DOCUMENTS

EP    2703935 A2    3/2014

OTHER PUBLICATIONS

Brad Linder, "Toshiba Dynabook KIRA L93 is a "7-in-1" Convertible PC,"May 19, 2014, pp. 1-3, Liliputing.
(Continued)

*Primary Examiner* — Jerry Wu
(74) *Attorney, Agent, or Firm* — HP Inc Patent Department

(57) ABSTRACT

Examples disclosed herein provide a computing device. One example computing device includes a base member, a support member rotatably connected to the base member at a first end of the support member, and a display member rotatably connected at a second end of the support member opposite the first end of the support member. The computing device includes a kickstand rotatably connected to a back surface of the display member at a first end of the kickstand, and magnetic members to magnetically couple the support member with a second end of the kickstand opposite the first end of the kickstand. When the device is to change from a first operation mode to a second operation mode, the kickstand is to move along the support member via the magnetic coupling.

15 Claims, 6 Drawing Sheets

(52) U.S. Cl.
CPC ............... *G06F 1/16* (2013.01); *G06F 1/162* (2013.01); *G06F 1/1615* (2013.01)

(58) Field of Classification Search
USPC .................................................... 361/679.21
See application file for complete search history.

(56) References Cited

U.S. PATENT DOCUMENTS

| | | |
|---|---|---|
| 6,768,635 B2 | 7/2004 | Lai et al. |
| 7,123,471 B2 | 10/2006 | Wang et al. |
| 2006/0038795 A1 | 2/2006 | Lee |
| 2006/0077622 A1* | 4/2006 | Keely .................. G06F 1/1616 361/679.09 |
| 2010/0001163 A1* | 1/2010 | Takizawa ............. F16M 11/105 248/371 |
| 2013/0277271 A1 | 10/2013 | Toulotte |
| 2013/0293430 A1 | 11/2013 | Henty |
| 2014/0029189 A1 | 1/2014 | Chang et al. |
| 2014/0139989 A1* | 5/2014 | Mori .................... G06F 1/1628 361/679.09 |

OTHER PUBLICATIONS

Jeremiah Rice, "Lenovo Announces Curvy Yoga Tablets with Built-in Kickstands," Oct. 29, 2013, pp. 1-7, Android Police, Illogical Robot LLC.

Tim Rolston, "Surface Pro 3 Features," May 21, 2014, pp. 1-8, Lovemysurface.net.

\* cited by examiner

COMPUTING DEVICE WITH A ROTATABLE DISPLAY MEMBER

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end via one or more hinges, for example. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

DETAILED DESCRIPTION

Figure 1:
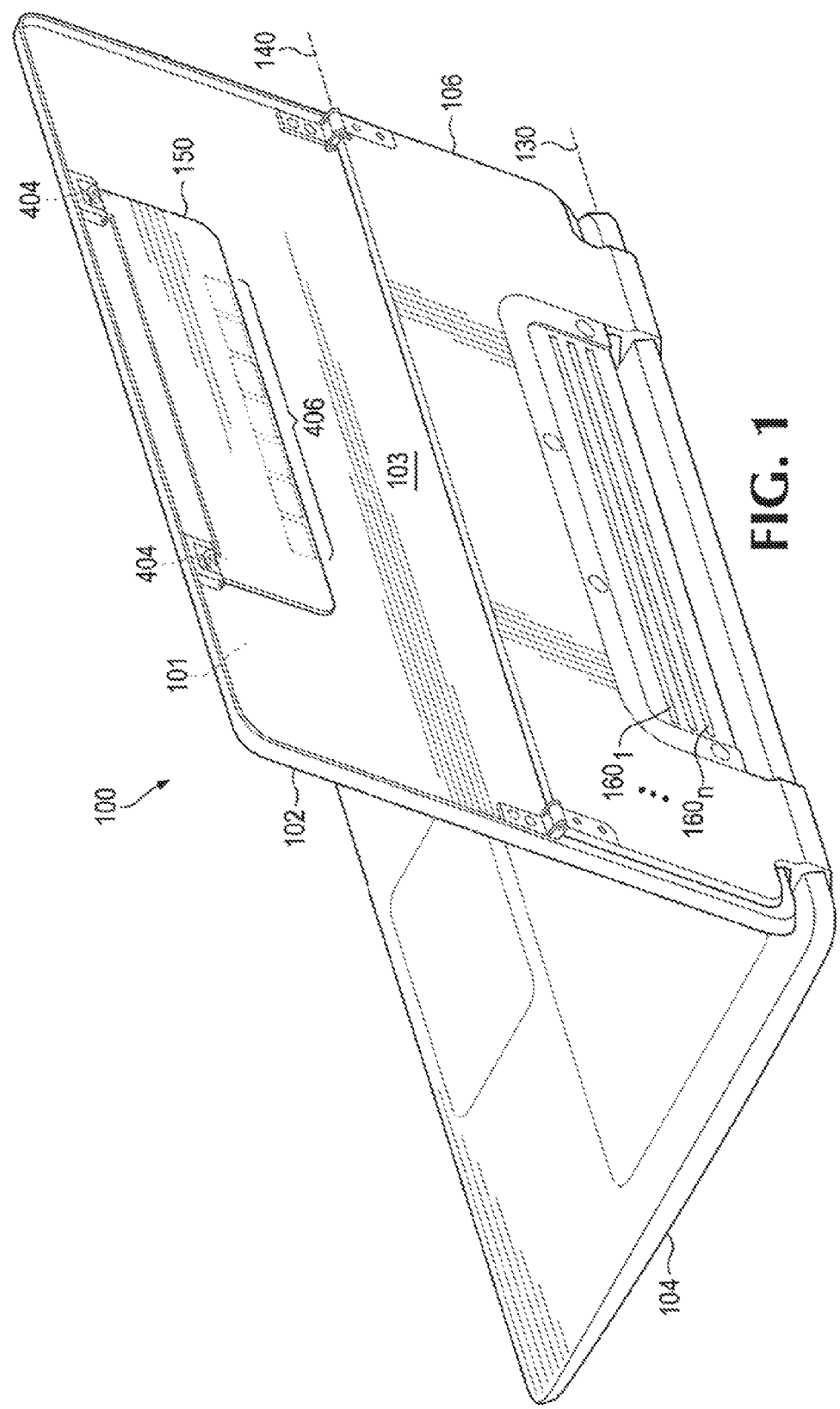
FIG. 1 illustrates a computing device in a laptop operation mode, as an example.

Notebook computers may include a feature that allows the device to be "converted" from one style of use to at least another style of use. For example, a notebook computer may be converted from a laptop operation mode, where the touchpad and keyboard are used as input components, to a tablet operation mode, where the viewable display is used for both viewing and input. Such devices that serve this dual purpose may be called convertible laptops. Many form factors exist for convertible laptops.

Examples disclosed herein provide a form factor for a convertible laptop including a mechanism that allows the display member to flip over when operating the laptop in tablet mode. For example, from laptop mode, the display member may be flipped over via the mechanism to operate the viewable display of the laptop as a tablet. As a result of flipping the display member over, the display member and base member may be collapsed against each other in an open, folded position. In this open, folded position, the touchpad and keyboard of the base member may be covered by the back surface of the display member.

In one example, computing device includes a base member, a support member rotatably connected to the base member at a first end of the support member, and a display member rotatably connected at a second end of the support member opposite the first end of the support member. The computing device further includes a kickstand rotatably connected to a back surface of the display member at a first end of the kickstand, and magnetic members to magnetically couple the support member with a second end of the kickstand opposite the first end of the kickstand. When the device is to change from a first operation mode to a second operation mode, the kickstand is to move along the support member via the magnetic coupling.

In another example, computing device includes a base member, a support member rotatably connected to the base member at a first end of the support member, and a display member rotatably connected at a second end of the support member opposite the first end of the support member. The computing device further includes a kickstand rotatably connected to a back surface of the display member at a first end of the kickstand, and magnetic members to magnetically couple the support member with a second end of the kickstand opposite the first end of the kickstand. The kickstand is rotatably connected via springs to bias the kickstand toward the back surface. When the device is to change from a first operation mode to a second operation mode, the magnetic coupling is to overcome the bias provided by the springs, wherein the kickstand is to move along the support member via the magnetic coupling.

In yet another example, computing device includes a base member, a support member rotatably connected to the base member at a first end of the support member, and a display member rotatably connected at a second end of the support member opposite the first end of the support member. The support member includes detent grooves. The computing device further includes a kickstand rotatably connected to a back surface of the display member at a first end of the kickstand, and magnetic members to magnetically couple the detent grooves of the support member with a second end of the kickstand opposite the first end of the kickstand.

Figure 2:
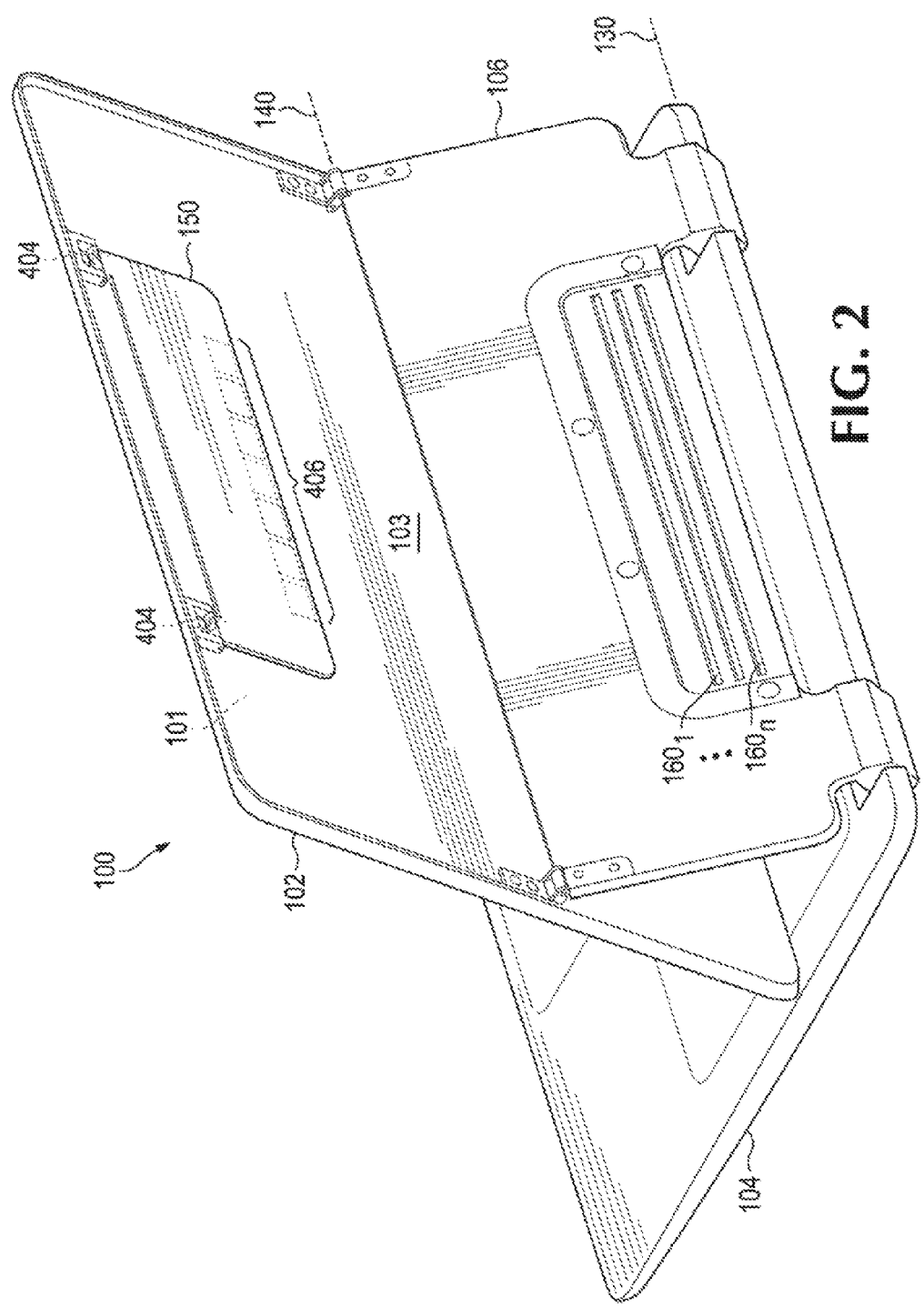
FIG. 2 illustrates the computing device in another operation mode, as an example.

With reference to the figures, FIG. 1 illustrates a computing device 100 in a laptop operation mode, as an example. The device 100 includes a display member 102 and a base member 104 that are joined together via a support member 106 (e.g., also see FIG. 2). The base member 104 includes a top surface that may include input means for operation by a user, such as a keyboard and/or a touchpad. The display member 102 includes a display surface 101 and a back surface 103 opposite the display surface 101. As an example, the display surface 101 may be used for viewing the video output of the laptop 100, and include input means for operation by a user, such as a touchscreen.

Referring to FIG. 1, the support member 106 may be rotatably connected to the base member 104 via a shaft at a first end of the support member 106. As an example, the shaft may be fixed within the base member 104, and the support member 106 may be rotatably connected to the base member 104 around a first axis of rotation 130. The display member 102 may be rotatably connected at a second end of the support member 106 opposite the first end (e.g., see FIG. 2). As an example, the display member 102 may be rotatably connected to the support member 106 around a second axis of rotation 140 that is parallel to the first axis of rotation 130.

As an example, the display member 102 may be connected to the second end of the support member 106 via hinges having two pivot points. A first pivot point of the hinges may be attached to the back surface 103 of the display member 102, and a second pivot point of the hinges may be attached to the support member 106. The two pivot points may collectively make the second axis of rotation 140. As illustrated in FIG. 1, the display member 102 may form an angle with respect to the base member 104, which may be an appropriate angle for the device 100 to be operated in laptop mode where, for example, the touchpad and/or keyboard is used as input.

When a user operates a convertible laptop in its various modes, it is desirable for the laptop to feel sturdy and rigid. For example, when the user operates the laptop in laptop mode by setting the display member at an appropriate viewing angle, it is not desirable for the display member 102 to fall forwards or backwards as the user operates the laptop. Referring to FIG. 1, the support member 106 may be rotatably connected to the base member 104 via friction hinges that, for example, provide friction for resisting a torque provided by a user while operating the computing device 100. The friction hinges, rotating around the first axis of rotation 130 via the shaft, may allow for the display member 102 to be viewed at a variety of viewing angles. As an example, the friction hinges may support the display member 102 at any desired open angle with sufficient resistance to allow, for example, touch screen computing.

Figure 3:
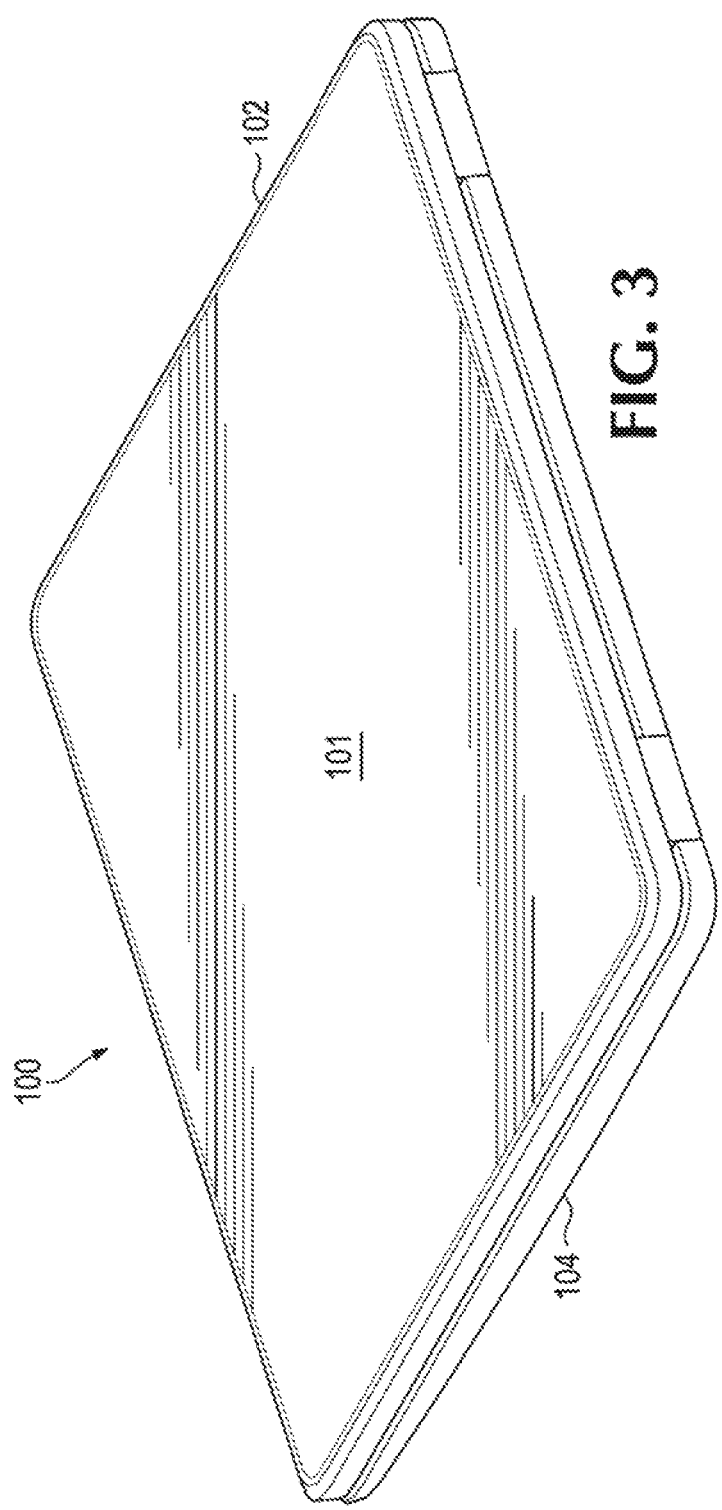
FIG. 3 illustrates the computing device in a tablet operation mode, as an example.

As mentioned above, the display member 102 may be rotatably connected at an end of the support member 106. As an example, the pivot between the display member 102 and the support member 106 may allow for the display member 102 to pivot a full 180 degrees. The display member 102 may pivot around the support member 106 to operate in a tablet operation mode, as illustrated in FIG. 3. While in tablet operation mode, the display member 102 and base member 104 may be in a parallel orientation and collapsed against each other in an open, folded position. In this open, folded position, the touchpad and keyboard of the base member 104 may be covered by the back surface 103 of the display member 102.

Figure 4:
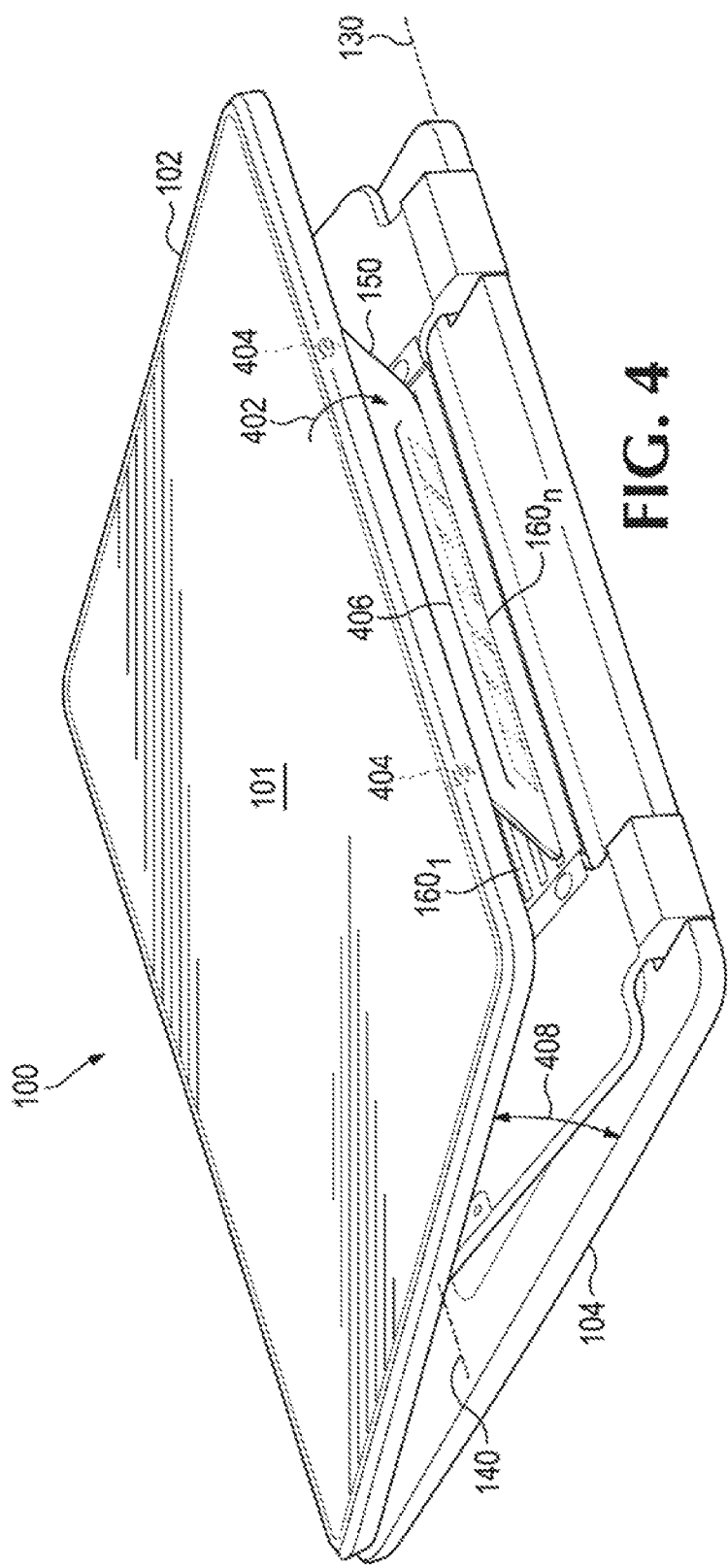
FIG. 4 illustrates the computing device in an inking mode operation, as an example.

In addition to the operation modes described above (e.g., laptop operation mode and tablet operation mode), the computing device 100 may be operable in another mode known as inking operation mode. As the name implies, inking operation mode allows a user to interact with the display surface 101 of the device 100 (e.g., touchscreen) via a finger or stylus, such as a digital pen. Rather, than having the touchscreen lay flat, as it does in tablet operation mode (e.g., see FIG. 3), it is preferable for the display surface 101 to be viewed at an angle 408, as illustrated in FIG. 4. Interacting with the display surface 101 at an angle while operating in inking operation mode may contribute towards physical ergonomics. Similar to the desire for the computing device 100 to feel sturdy and rigid while in laptop operation mode, as described above, it is also preferable for the device 100 to feel sturdy and rigid while being used in inking operation mode. For example, when the user interacts with the display surface 101 with a digital pen, it is not desirable for the display member 102 to collapse and fall backwards towards the base member 104.

As an example, the computing device 100 may include a kickstand 150 for providing stability while operating the device 100 in inking operation mode. As will be further described, computing device 100 may include a mechanism for utilizing the kickstand 150 when the device 100 is being transitioned to inking operation mode. In addition, the mechanism may retract the kickstand 150 towards the back surface 103 of the display member 102 as the device 100 is transitioned from the inking operation mode to another operation mode (e.g., laptop mode). By retracting the kickstand 150 towards the back surface 103 when the device 100 is no longer being used in inking operation mode, the kickstand 150 may be stowed away to avoid any damage, as illustrated in FIG. 1.

Referring to FIG. 4, the kickstand 150 may be rotatably connected to the back surface 103 of the display member 102 at a first end of the kickstand 150 (also illustrated in FIG. 1). Although a single kickstand 150 is illustrated, multiple kickstands may be utilized, with varying widths. The kickstand 150 may be spring loaded by including springs 404 to bias the kickstand 150 towards the back surface 103 (indicated by arrow 402). The springs 404 may enable automatic rotation of the kickstand 150 towards the back surface 103 when the device is not in inking operation mode, or being transitioned from inking operation mode to another operation mode, as will be further described. Referring back to FIG. 1, the springs 404 may stow away the kickstand 150 when the computing device 100 is in another mode besides inking operation mode, such as laptop operation mode. The springs 404 may be, for example, a compression spring, a torsion spring, etc. The computing device 100 may include multiple springs 404 or a single spring 404 for stowing away the kickstand 150.

For utilizing the kickstand 150 when the computing device 100 is being transitioned to inking operation mode, the computing device 100 may include magnetic members for magnetically coupling the kickstand 150 with the support member 106. As an example, the kickstand 150 may include ferrous materials and/or magnetic members 406 disposed within the kickstand 150 to magnetically couple a second end of the kickstand 150 with the support member 106, as illustrated in FIG. 4. In order to extend the kickstand 150 from its retracted position, the force provided by the magnetic coupling may be greater then the spring loading provided by the springs 404. For example, when the device 100 is changed from a first operation mode (e.g., tablet mode illustrated in FIG. 3) to a second operation mode (e.g., inking mode), the magnetic coupling between the support member 106 and the second end of the kickstand 150 may overcome the bias provided by the spring 404. As a result, the magnetic coupling may bias the kickstand 150 away from the back surface 103 and cause the kickstand 150 to move along the support member 106 as the device is transitioned to inking mode. The placement of the magnetic members 406 within the kickstand 150 may vary. As an example, the kickstand 150 itself may be a magnetic member.

Friction between the kickstand 150 and the support 106 may provide the support for operating the computing device 100 in inking operation mode. As an example, in order to provide support independent of friction, the support member 106 may include detent grooves 160 to create and support the magnetic coupling between the support member 106 and the second end of the kickstand 150. As an example, the detent grooves 160 may be disposed on a steel plate for magnetically coupling with the magnetic members 406 of the kickstand 150. As illustrated in the figures, the support member 106 may include multiple detent grooves $160_1$-$160_n$ in order to provide a choice of viewing angles while the computing device 100 is in inking operation mode. For example, as the computing device 100 is transitioned to inking operation mode, where the display member 102 is lifted from the base member 104, the kickstand 150 may move from one detent groove (e.g., $160_1$) to another detent groove (e.g., $160_n$) until the display surface 101 is at a desirable viewing angle. As the kickstand 150 moves from one detent groove to another detent groove, the angle 408 changes. In addition, as the force provided by the magnetic coupling may be greater than the spring loading provided by the spring 404, the kickstand 150 may be biased further away from the display member 102 as the viewing angle 408 is increased in inking mode.

As an example, the support member 106 may have a corresponding ferrous and/or magnetic material for magnetically coupling with the magnetic members 406 of the kickstand 150. The magnetic members 406 may be arranged to produce magnetic fields that cooperate with the support member 106 to generate a magnetic attractive force that attaches the second end of the kickstand 150 and the support member 106 together in a mating engagement. As mentioned above, the detent grooves 160 may be disposed on a steel plate, which magnetically couples with magnetic members 406 of the kickstand 150. Properties of the magnetic members that may be controlled include, but are not limited to, field strength and magnetic polarity. The arrangement of the magnetic members 406 may vary.

Figure 5A:
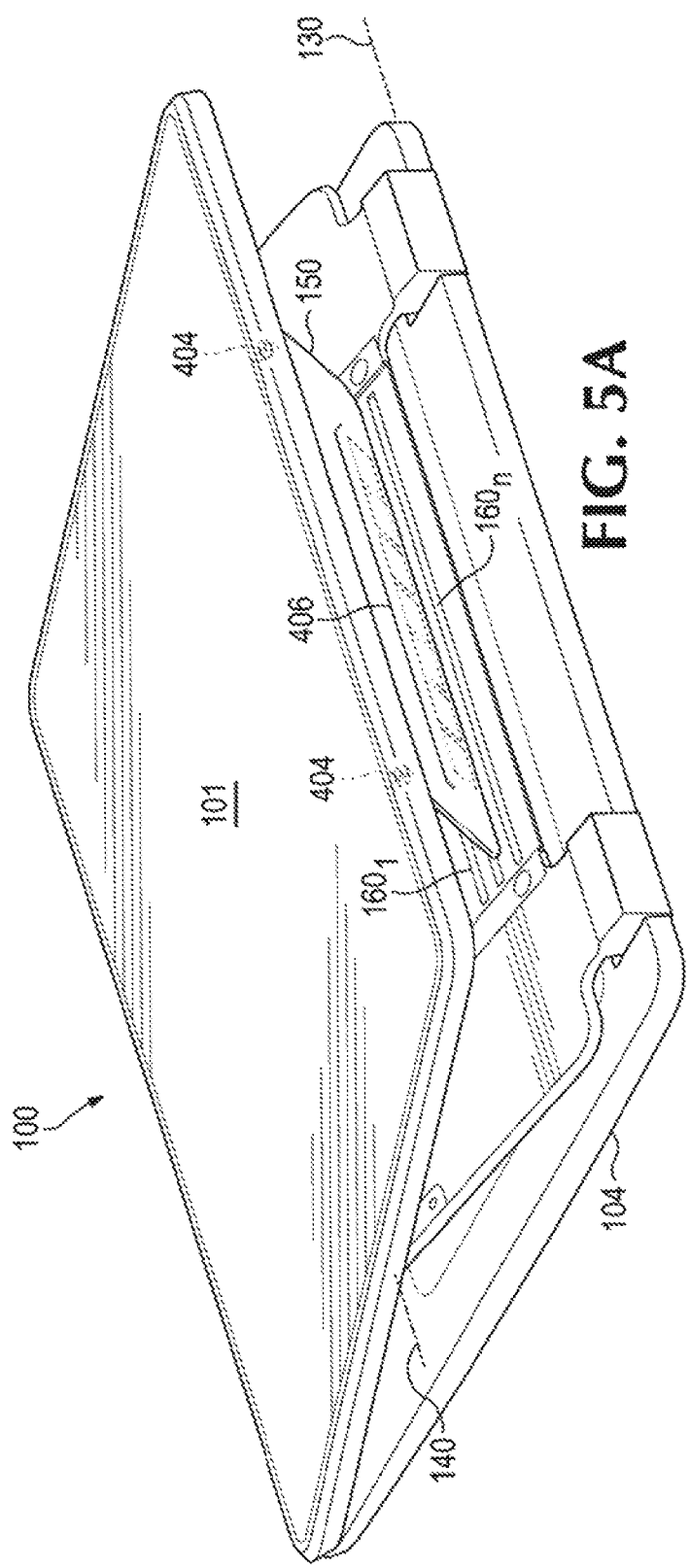
FIGS. 5A-B illustrate the transition of the computing device from the inking operation mode, as an example.
Figure 5B:
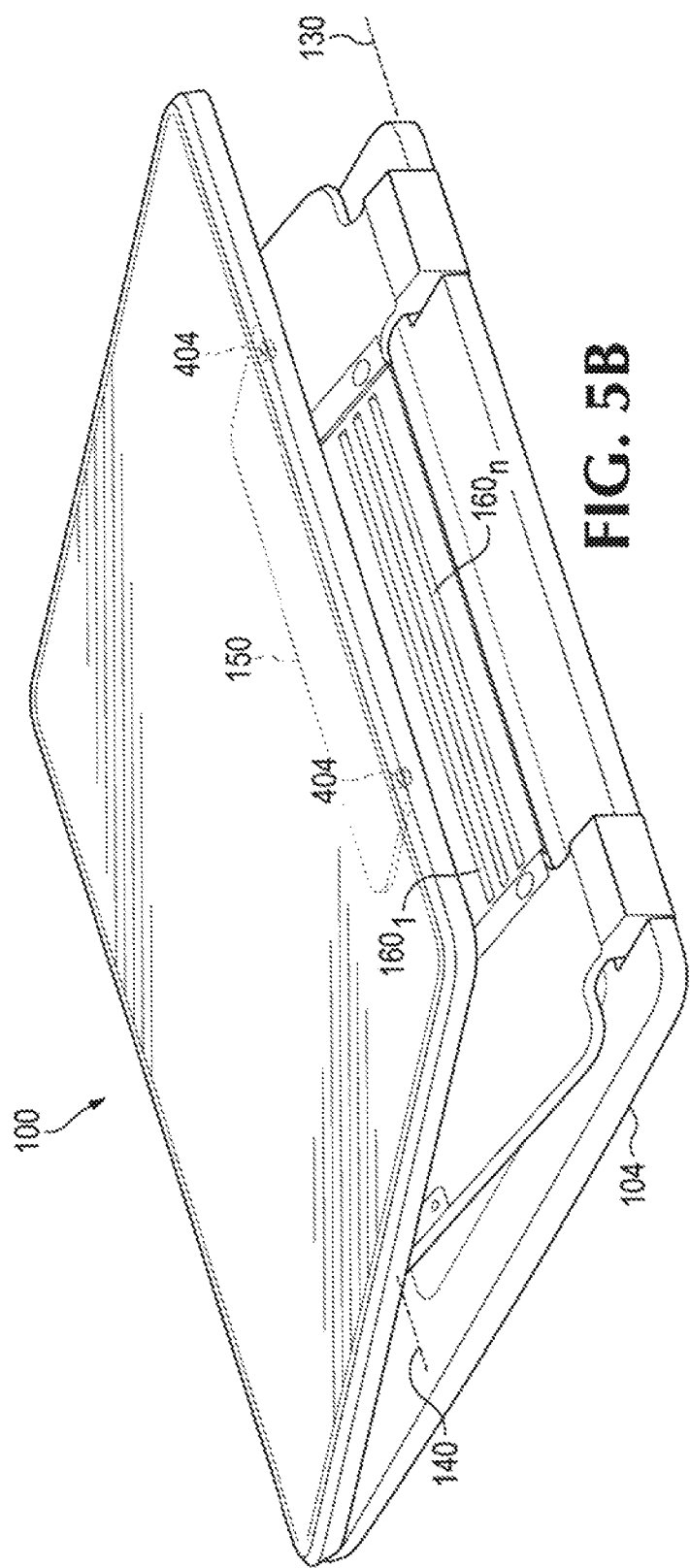

FIGS. 5A-B illustrate the stowing away of kickstand 150 as the computing device 100 is transitioned from inking mode to a third operation mode, such as laptop mode, according to an example. Referring to FIG. 5A, during the transition from inking mode to laptop mode, there may be a moment where the spring loading provided by the springs 404 may overcome the force provided by the magnetic coupling between the kickstand 150 and support member 106. For example, upon the kickstand 150 magnetically coupling to the last detent groove 160$_6$, if the display member 102 is raised any further by increasing the viewing angle 408, the force provided by the magnetic coupling may drop off steeply and be overcome by the spring loading provided by the springs 404. As a result, the springs 404 may bias the kickstand 150 by automatically rotating the kickstand 150 back towards the back surface 103 of the display member 102, as illustrated in FIG. 5B. As an example, the magnetic members 406 disposed within the kickstand 150 may include alternating-pole magnets that provide a force profile that drops off steeply with distance, so that upon reaching the last detent groove 160$_n$, the force provided by the magnetic coupling may be overcome by the spring loading provided by the springs 404.

It should be understood that examples described herein below may include various components and features. It should also be understood that, in the following description, numerous specific details are set forth to provide a thorough understanding of the examples. However, it should be understood that the examples may be practiced without limitations to these specific details. In some instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It should be understood that the previous description of the disclosed examples is provided to enable any person skilled in the art to make or use the present disclosure. Various modifications to these examples will be readily apparent to those skied in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising: a base member; a support member rotatably connected to the base member at a first end of the support member; a display member comprising a middle portion which is rotatably connected at a second end of the support member opposite the first end of the support member; a kickstand rotatably connected to a back surface of the display member at a first end of the kickstand; and magnetic members to magnetically couple the support member with a second end of the kickstand opposite the first end of the kickstand, wherein, when the device is to change from a first operation mode to a second operation mode having different angles with respect to the support member, the kickstand is to move along and engage to a plurality of locations of the support member via the magnetic coupling.

2. The computing device of claim 1, further comprising:
a spring to bias the kickstand toward the back surface of the display member.

3. The computing device of claim 2, wherein, when the computing device is to change from the first operation mode to the second operation mode, the magnetic coupling between the support member and the second end of the kickstand is to overcome the bias provided by the spring, wherein the magnetic coupling is to bias the kickstand away from the back surface of the display member.

4. The computing device of claim 3, wherein when the computing device is to change from the second operation mode to a third operation mode, the spring is to overcome the magnetic coupling between the support member and the second end of the kickstand, wherein the spring is to bias the kickstand back toward the back surface of the display member.

5. The computing device of claim 1, wherein the support member comprises detent grooves to support the magnetic coupling between the support member and the second end of the kickstand.

6. The computing device of claim 5, wherein the detent grooves are to provide multiple viewing angles for the display member when the computing device is in the second operation mode.

7. A computing device comprising: a base member; a support member rotatably connected to the base member at a first end of the support member; a display member comprising a middle portion which is rotatably connected at a second end of the support member opposite the first end of the support member; a kickstand rotatably connected to a back surface of the display member at a first end of the kickstand, wherein the kickstand is rotatably connected via springs to bias the kickstand toward the back surface; and magnetic members to magnetically couple the support member with a second end of the kickstand opposite the first end of the kickstand, wherein, when the device is to change from a first operation mode to a second operation mode having different angles with respect to the support member, the magnetic coupling is to overcome the bias provided by the springs, wherein the kickstand is to move along and engage to a plurality of locations of the support member via the magnetic coupling.

8. The computing device of claim 7, wherein, when the computing device is to change from the first operation mode to the second operation mode, the magnetic coupling is to bias the kickstand away from the back surface of the display member.

9. The computing device of claim 8, wherein when the computing device is to change from the second operation mode to a third operation mode, the springs are to overcome the magnetic coupling between the support member and the second end of the kickstand, wherein the springs are to bias the kickstand back toward the back surface of the display member.

10. The computing device of claim 7, wherein the support member comprises detent grooves to support the magnetic coupling between the support member and the second end of the kickstand.

11. The computing device of claim 10, wherein the detent grooves are to provide multiple viewing angles for the display member when the computing device is in the second operation mode.

12. A computing device comprising: a base member; a support member rotatably connected to the base member at a first end of the support member, wherein the support member comprises detent grooves; a display member comprising a middle portion which is rotatably connected at a second end of the support member opposite the first end of the support member; a kickstand rotatably connected to a back surface of the display member at a first end of the kickstand; and magnetic members to magnetically couple the detent grooves of the support member with a second end of the kickstand opposite the first end of the kickstand and adjusting the display member to stay on a plurality of angles related to the base member.

13. The computing device of claim 12, further comprising:

a spring to bias the kickstand toward the back surface of the display member.

14. The computing device of claim 13, wherein, when the computing device is to change from a first operation mode to a second operation mode, the magnetic coupling is to overcome the bias provided by the spring, wherein the magnetic coupling is to bias the kickstand away from the back surface of the display member.

15. The computing device of claim 14, wherein when the computing device is to change from the second operation mode to a third operation mode, the spring is to overcome the magnetic coupling between the support member and the second end of the kickstand, wherein the spring is to bias the kickstand back toward the back surface of the display member.

* * * * *

UNITED STATES PATENT AND TRADEMARK OFFICE
CERTIFICATE OF CORRECTION

PATENT NO. : 9,927,842 B2  
APPLICATION NO. : 15/500675  
DATED : March 27, 2018  
INVENTOR(S) : Chan Park et al.

Page 1 of 1

It is certified that error appears in the above-identified patent and that said Letters Patent is hereby corrected as shown below:

On the Title Page

In item (72), Inventors, in Column 1, Line 1, delete "Houtson" and insert -- Houston --, therefor.

Signed and Sealed this  
Seventh Day of August, 2018

Andrei Iancu  
*Director of the United States Patent and Trademark Office*